US008291427B2

(12) United States Patent
Archer et al.

(10) Patent No.: US 8,291,427 B2
(45) Date of Patent: Oct. 16, 2012

(54) SCHEDULING APPLICATIONS FOR EXECUTION ON A PLURALITY OF COMPUTE NODES OF A PARALLEL COMPUTER TO MANAGE TEMPERATURE OF THE NODES DURING EXECUTION

(75) Inventors: Charles J. Archer, Rochester, MN (US); Michael A. Blocksome, Rochester, MN (US); Amanda E. Peters, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 12/135,660

(22) Filed: Jun. 9, 2008

(65) Prior Publication Data
US 2009/0307703 A1 Dec. 10, 2009

(51) Int. Cl.
G06F 9/46 (2006.01)
(52) U.S. Cl. ...................................... 718/104
(58) Field of Classification Search .................... 718/104
See application file for complete search history.

(56) References Cited

U.S. PATENT DOCUMENTS

| | | | | |
|---|---|---|---|---|
| 5,850,539 | A * | 12/1998 | Cook et al. ................... 703/20 |
| 6,760,852 | B1 * | 7/2004 | Gulick ........................... 713/324 |
| 6,804,632 | B2 * | 10/2004 | Orenstien et al. ............. 702/188 |
| 7,251,737 | B2 | 7/2007 | Weinberger et al. |
| 7,281,146 | B2 | 10/2007 | Nalawadi et al. |
| 7,284,137 | B2 | 10/2007 | Clark et al. |
| 7,305,569 | B2 | 12/2007 | Reilly |
| 7,330,983 | B2 * | 2/2008 | Chaparro et al. ............. 713/300 |
| 7,533,282 | B2 | 5/2009 | Ohneda et al. |
| 7,549,069 | B2 | 6/2009 | Ishihara et al. |
| 7,716,500 | B2 | 5/2010 | Esliger |
| 7,885,795 | B2 * | 2/2011 | Rasmussen et al. ............ 703/5 |
| 2004/0073822 | A1 | 4/2004 | Greco et al. |
| 2004/0153867 | A1 | 8/2004 | McAlinden et al. |
| 2004/0168097 | A1 | 8/2004 | Cook et al. |
| 2004/0264652 | A1 * | 12/2004 | Erhart et al. ................ 379/88.01 |
| 2005/0055590 | A1 | 3/2005 | Farkas et al. |
| 2005/0177327 | A1 | 8/2005 | Banginwar et al. |
| 2006/0253507 | A1 | 11/2006 | Schank et al. |
| 2006/0282838 | A1 | 12/2006 | Gupta et al. |
| 2007/0005998 | A1 | 1/2007 | Jain et al. |
| 2007/0033367 | A1 | 2/2007 | Sakarda et al. |
| 2007/0067657 | A1 | 3/2007 | Ranganathan et al. |
| 2007/0198864 | A1 | 8/2007 | Takase |

(Continued)

OTHER PUBLICATIONS

Final Office Action, U.S. Appl. No. 11/553,101, Mar. 31, 2010.

(Continued)

*Primary Examiner* — Meng An
*Assistant Examiner* — Blake Kumabe
(74) *Attorney, Agent, or Firm* — Biggers & Ohanian, LLP

(57) ABSTRACT

Methods, apparatus, and products are disclosed for scheduling applications for execution on a plurality of compute nodes of a parallel computer to manage temperature of the plurality of compute nodes during execution that include: identifying one or more applications for execution on the plurality of compute nodes; creating a plurality of physically discontiguous node partitions in dependence upon temperature characteristics for the compute nodes and a physical topology for the compute nodes, each discontiguous node partition specifying a collection of physically adjacent compute nodes; and assigning, for each application, that application to one or more of the discontiguous node partitions for execution on the compute nodes specified by the assigned discontiguous node partitions.

18 Claims, 8 Drawing Sheets

U.S. PATENT DOCUMENTS

| | | | |
|---|---|---|---|
| 2007/0300083 A1 | 12/2007 | Goodrum et al. | |
| 2008/0059555 A1* | 3/2008 | Archer et al. | 709/201 |
| 2008/0178029 A1 | 7/2008 | McGrane et al. | |
| 2008/0228462 A1 | 9/2008 | Gross et al. | |
| 2008/0234873 A1 | 9/2008 | Gorbatov et al. | |
| 2008/0313482 A1 | 12/2008 | Karlapalem et al. | |
| 2009/0024819 A1 | 1/2009 | Fisher et al. | |
| 2009/0187658 A1 | 7/2009 | Williams et al. | |
| 2009/0265568 A1 | 10/2009 | Jackson | |

OTHER PUBLICATIONS

Office Action, U.S. Appl. No. 12/127,035, Jan. 5, 2011.
Office Action, U.S. Appl. No. 12/135,593, Mar. 30, 2011.
Office Action, U.S. Appl. No. 12/129,334, Jun. 9, 2011.
Office Action, U.S. Appl. No. 12/129,205, Jun. 3, 2011.
Office Action, U.S. Appl. No. 12/135,593, Aug. 26, 2011.
Office Action, U.S. Appl. No. 12/167,302, Oct. 12, 2011.
Office Action, U.S. Appl. No. 12/135,660, Sep. 29, 2011.
Office Action, U.S. Appl. No. 12/129,319, Sep. 30, 2011.
Notice of Allowance, U.S. Appl. No. 12/127,035, Jun. 13, 2011.
Notice of Allowance, U.S. Appl. No. 13/277,350, Dec. 14, 2011.
Notice of Allowance, U.S. Appl. No. 12/129,223, Sep. 6, 2011.
Final Office Action, U.S. Appl. No. 12/129,205, Jan. 10, 2012.

* cited by examiner

SCHEDULING APPLICATIONS FOR EXECUTION ON A PLURALITY OF COMPUTE NODES OF A PARALLEL COMPUTER TO MANAGE TEMPERATURE OF THE NODES DURING EXECUTION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for scheduling applications for execution on a plurality of compute nodes of a parallel computer to manage temperature of the plurality of compute nodes during execution.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

Using different sets of compute nodes connected through such data communications networks, a parallel computer is often utilized to execute multiple applications concurrently. Each application is typically executed by a different set of compute nodes. Because different applications typically instruct the compute nodes to utilize the compute node hardware in different ways, the compute nodes' power consumption may vary from one set of nodes to another. If two physically adjacent sets of compute nodes concurrently execute applications that result in high compute node power consumption, then the temperature at that physical region in the parallel computer may cause application errors or damage compute node hardware, thereby wasting valuable business resources.

SUMMARY OF THE INVENTION

Methods, apparatus, and products are disclosed for scheduling applications for execution on a plurality of compute nodes of a parallel computer to manage temperature of the plurality of compute nodes during execution that include: identifying one or more applications for execution on the plurality of compute nodes; creating a plurality of physically discontiguous node partitions in dependence upon temperature characteristics for the compute nodes and a physical topology for the compute nodes, each discontiguous node partition specifying a collection of physically adjacent compute nodes; and assigning, for each application, that application to one or more of the discontiguous node partitions for execution on the compute nodes specified by the assigned discontiguous node partitions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
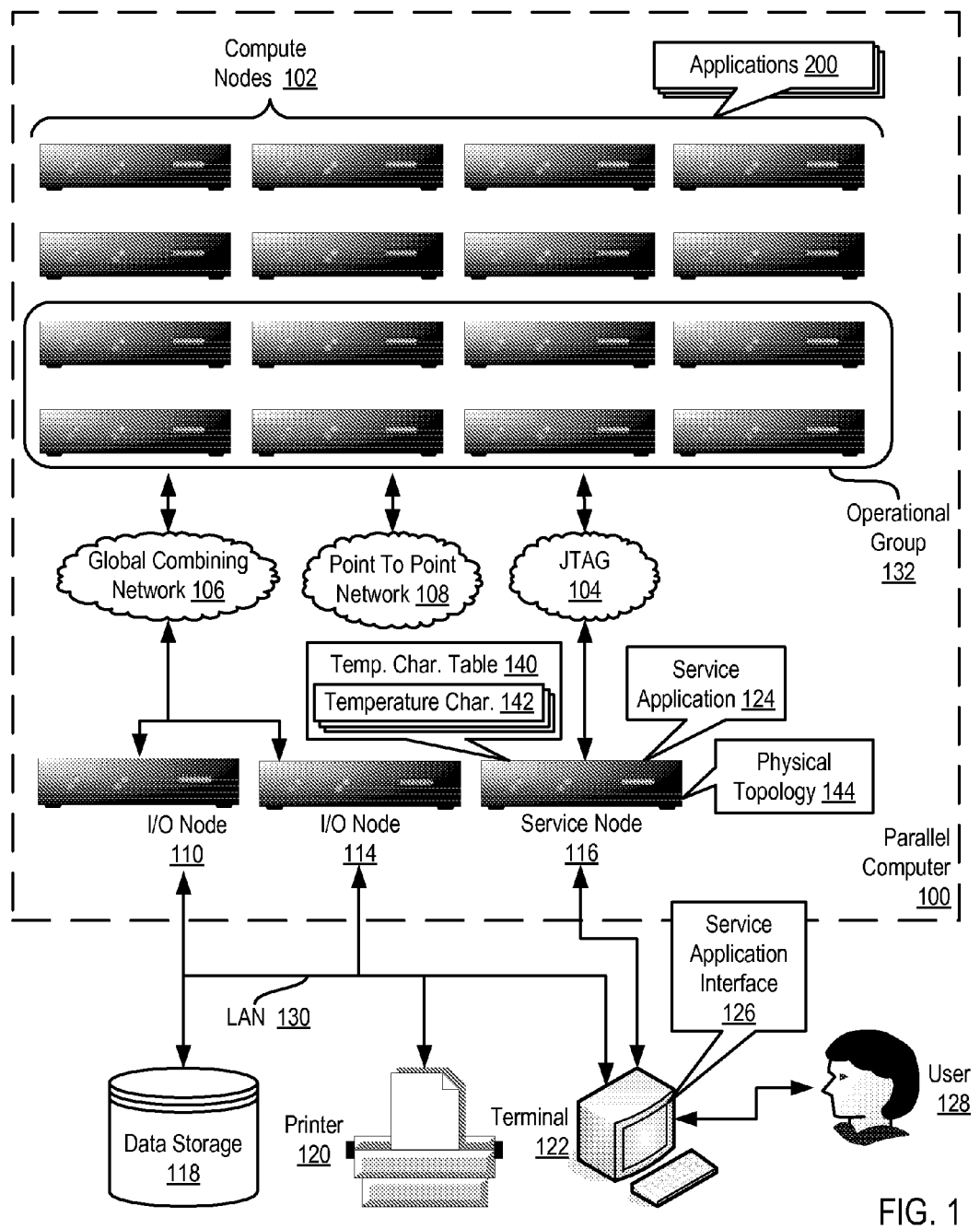
FIG. 1 illustrates an exemplary system for scheduling applications for execution on a plurality of compute nodes of a parallel computer to manage temperature of the plurality of compute nodes during execution according to embodiments of the present invention.

Exemplary methods, apparatus, and computer program products for scheduling applications for execution on a plurality of compute nodes of a parallel computer to manage temperature of the plurality of compute nodes during execution according to embodiments of the present invention are described with reference to the accompanying drawings, beginning with FIG. 1. FIG. 1 illustrates an exemplary system for scheduling applications for execution on a plurality of compute nodes (102) of a parallel computer (100) to manage temperature of the plurality of compute nodes (102) during execution according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) that execute a plurality of applications (200). Each application (200) of FIG. 1 is a set of computer program instructions that provide user-level data processing.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations such as for example a tree network, and a point to point network (108) which is optimized point to point operations such as for example a torus network. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102)

of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). The service node is a computer similar to a compute node and is designated for specialized management operations. Service node (116) provides services common to pluralities of compute nodes, administering the configuration of compute nodes and the hardware components of the compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the service application (124) includes a set of computer program instructions capable of scheduling applications (200) for execution on a plurality of compute nodes (102) of a parallel computer (100) to manage temperature of the plurality of compute nodes (102) during execution according to embodiments of the present invention. The service application (124) of FIG. 1 operates generally for scheduling applications (200) for execution on a plurality of compute nodes (102) of a parallel computer (100) to manage temperature of the plurality of compute nodes (102) during execution according to embodiments of the present invention by: identifying one or more applications (200) for execution on the plurality of compute nodes (102); creating a plurality of physically discontiguous node partitions in dependence upon temperature characteristics (142) for the compute nodes (102) and a physical topology (144) for the compute nodes (102), each discontiguous node partition specifying a collection of physically adjacent compute nodes; and assigning, for each application (200), that application (200) to one or more of the discontiguous node partitions for execution on the compute nodes (102) specified by the assigned discontiguous node partitions.

A node partition is a logical collection of physically adjacent compute nodes. The node partitions are 'physically discontiguous' in the sense that none of the compute nodes in distinct node partitions are adjacent to one another. That is, between physically discontiguous node partitions, there physically exists a group of compute nodes that are not members of either node partition, or the node partitions are made up of compute nodes installed in different hardware housings.

In the example of FIG. 1, the temperature characteristics (142) for each compute node (102) describe the temperature of the compute node in various operating states. For example, one temperature characteristic may describe the temperature of the compute node when executing a particular application, while another temperature characteristic may describe the temperature of the compute node when the node is idle. The temperature characteristics (142) of FIG. 1 may describe the temperature of the compute node as a whole or describe the temperature of individual hardware components that form the compute node. In the example of FIG. 1, the temperature characteristics (142) are stored in a temperature characteristics table (140). In some embodiments, the temperature characteristics (142) of FIG. 1 may describe the temperature using values from a temperature scale such as, for example, the Celsius scale, the Fahrenheit scale, the Kelvin scale, the Rankine scale, and so on. In some other embodiments, the temperature characteristics (142) of FIG. 1 may describe temperature using values of a non-temperature scale that have a known relationship to values of a temperature scale. For example, temperature characteristics may be described using power, which has the following relationship to temperature:

$$T = \sqrt[4]{\frac{P}{k}}$$

where T is temperature, P is power, and k is a constant for the environment.

In the example of FIG. 1, the physical topology (144) for the compute nodes (102) represents the physical configuration of the compute nodes in the parallel computer. That is, the physical topology (144) may represent the physical location of the compute nodes and each nodes' hardware components, the physical orientation of the compute nodes and each nodes' hardware components, and so on.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations.

The arrangement of nodes, networks, and I/O devices making up the exemplary system illustrated in FIG. 1 are for explanation only, not for limitation of the present invention. Data processing systems capable of scheduling applications for execution on a plurality of compute nodes of a parallel computer to manage temperature of the plurality of compute nodes during execution according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of scheduling applications for execution on a plurality of compute nodes of a parallel computer to manage temperature of the plurality of compute nodes during execution according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
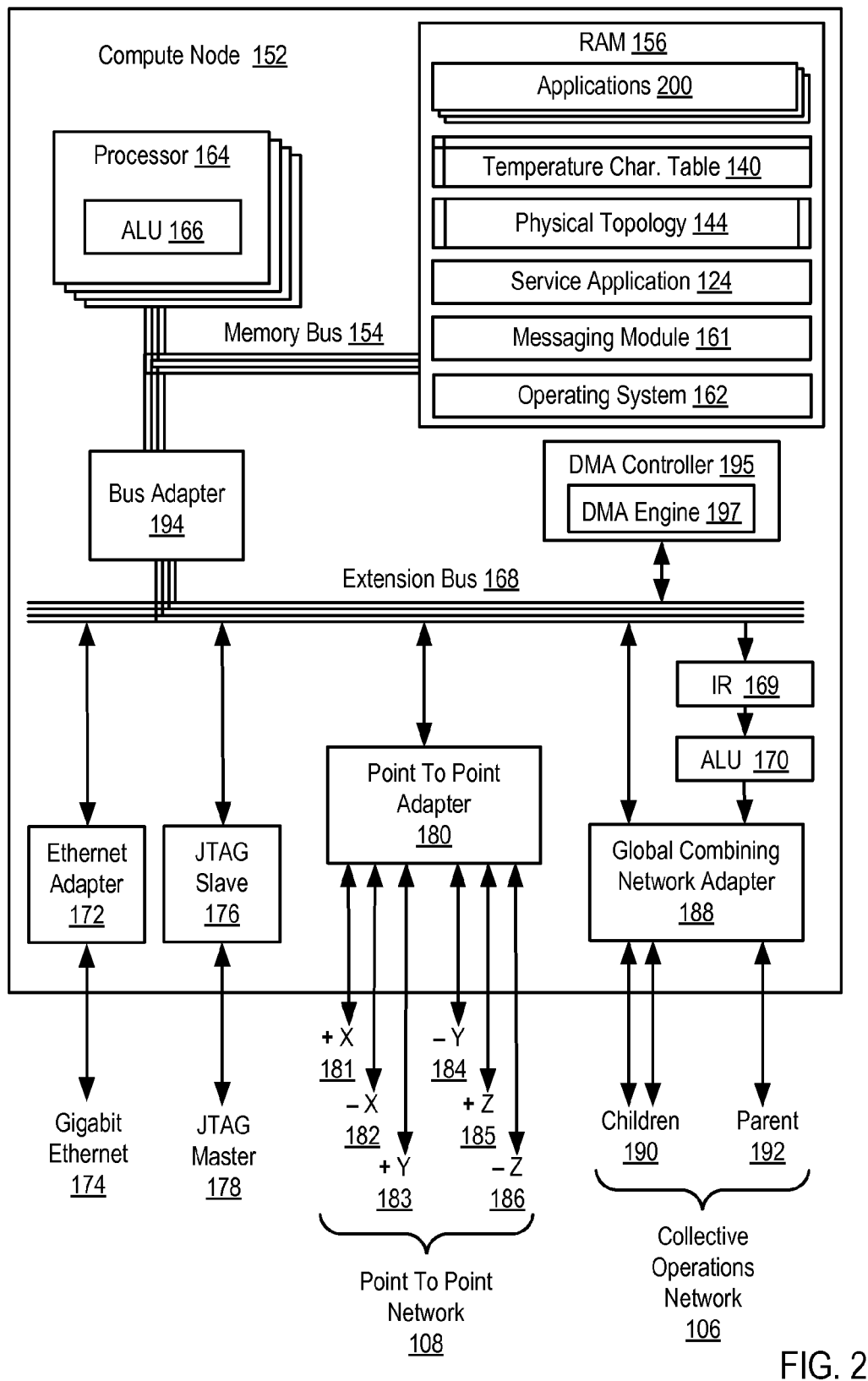
FIG. 2 sets forth a block diagram of an exemplary compute node useful in a parallel computer capable of scheduling applications for execution on a plurality of compute nodes of the parallel computer to manage temperature of the plurality of compute nodes during execution according to embodiments of the present invention.

Scheduling applications for execution on a plurality of compute nodes to manage temperature of the plurality of compute nodes during execution according to embodiments of the present invention is generally implemented on a parallel computer. Such system may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of scheduling applications for execution on a plurality of compute nodes of the parallel computer to manage temperature of the plurality of compute nodes during execution according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) of FIG. 2 is a plurality of applications (200). Each application (200) is a set of computer program instructions that provide user-level data processing.

Also stored in RAM (156) of FIG. 2 is a temperature characteristics table (140). The temperature characteristics table (140) is a data structure that stores temperature characteristics for the compute nodes of a parallel computer. Such temperature characteristics for each compute node describe the temperature of the compute node in various operating states. The temperature characteristics may describe the temperature of the compute node as a whole or describe the temperature of individual hardware components that form the compute node.

Also stored in RAM (156) of FIG. 2 is a physical topology (144) for the compute nodes (102). The physical topology (144) of FIG. 2 is a data structure that represents the physical configuration of the compute nodes in the parallel computer. That is, the physical topology (144) may represent the physical location of the compute nodes and each nodes' hardware components, the physical orientation of the compute nodes and each nodes' hardware components, and so on.

Also stored in RAM (156) of FIG. 2 is a service application (124), that is, a set of computer program instructions capable of scheduling applications for execution on a plurality of compute nodes of a parallel computer to manage temperature of the plurality of compute nodes during execution according to embodiments of the present invention. The service application (124) of FIG. 2 operates generally for scheduling applications for execution on a plurality of compute nodes of a parallel computer to manage temperature of the plurality of compute nodes during execution according to embodiments of the present invention by: identifying one or more applications (200) for execution on the plurality of compute nodes; creating a plurality of physically discontiguous node partitions in dependence upon temperature characteristics for the compute nodes and a physical topology (144) for the compute nodes (102), each discontiguous node partition specifying a collection of physically adjacent compute nodes; and assigning, for each application (200), that application (200) to one or more of the discontiguous node partitions for execution on the compute nodes specified by the assigned discontiguous node partitions.

Also stored in RAM (156) is a messaging module (161), a library of computer program instructions that carry out parallel communications among compute nodes, including point to point operations as well as collective operations. User-level applications such as application (200) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for scheduling applications for execution on a plurality of compute nodes of a parallel computer to manage temperature of the plurality of compute nodes during execution according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in scheduling applications for execution on a plurality of compute nodes of a parallel computer to manage temperature of the plurality of compute nodes during execution according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Although the explanation above with reference to FIG. 2 describes a compute node, readers will note that a service node may be similarly configured and operate in the same manner as the compute node (152) for scheduling applications for execution on a plurality of compute nodes of a parallel computer to manage temperature of the plurality of compute nodes during execution according to embodiments of the present invention. That is, a service node may include one or more processors, computer memory, bus adapters and buses, communications adapters, and so on, each operatively coupled together to providing processing for computer program instructions stored in computer memory.

Figure 3A:
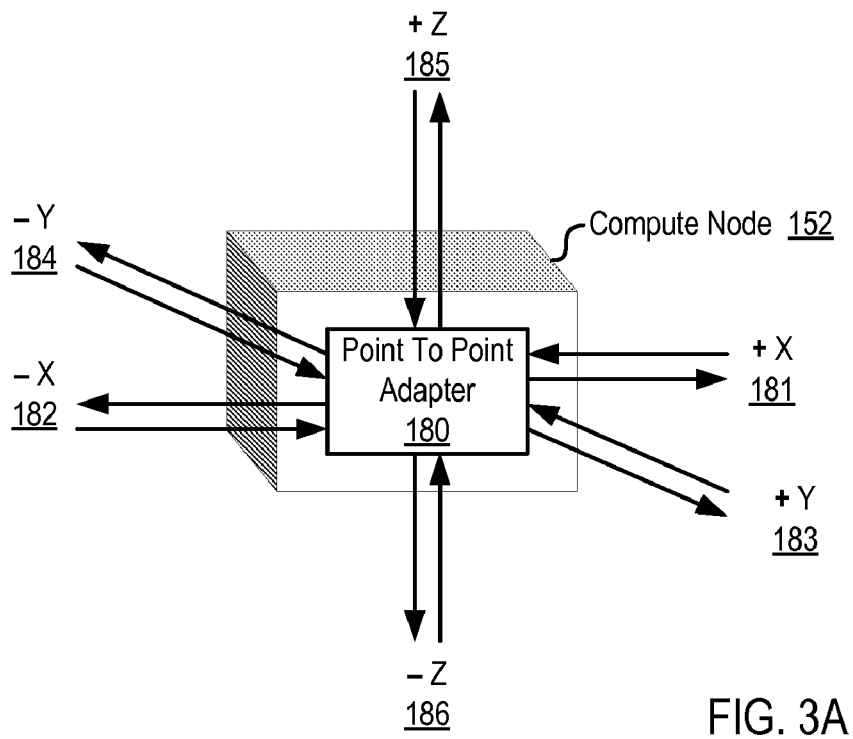
FIG. 3A illustrates an exemplary Point To Point Adapter useful in systems capable of scheduling applications for execution on a plurality of compute nodes of a parallel computer to manage temperature of the plurality of compute nodes during execution according to embodiments of the present invention.

For further explanation of the adapters described above, FIG. 3A illustrates an exemplary Point To Point Adapter (180) useful in systems capable of scheduling applications for execution on a plurality of compute nodes of a parallel computer to manage temperature of the plurality of compute nodes during execution according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
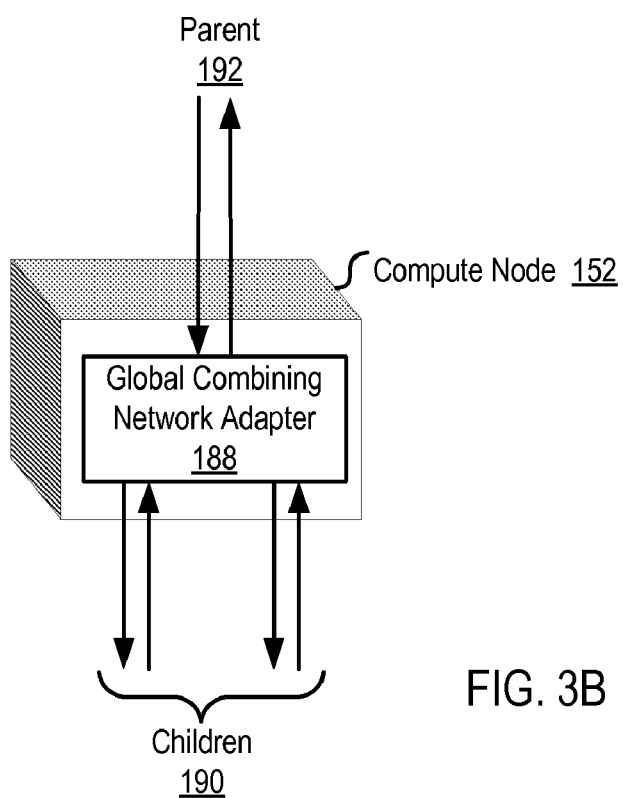
FIG. 3B illustrates an exemplary Global Combining Network Adapter useful in systems capable of scheduling applications for execution on a plurality of compute nodes of a parallel computer to manage temperature of the plurality of compute nodes during execution according to embodiments of the present invention.

For further explanation, FIG. 3B illustrates an exemplary Global Combining Network Adapter (188) useful in systems capable of scheduling applications for execution on a plurality of compute nodes of a parallel computer to manage temperature of the plurality of compute nodes during execution according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
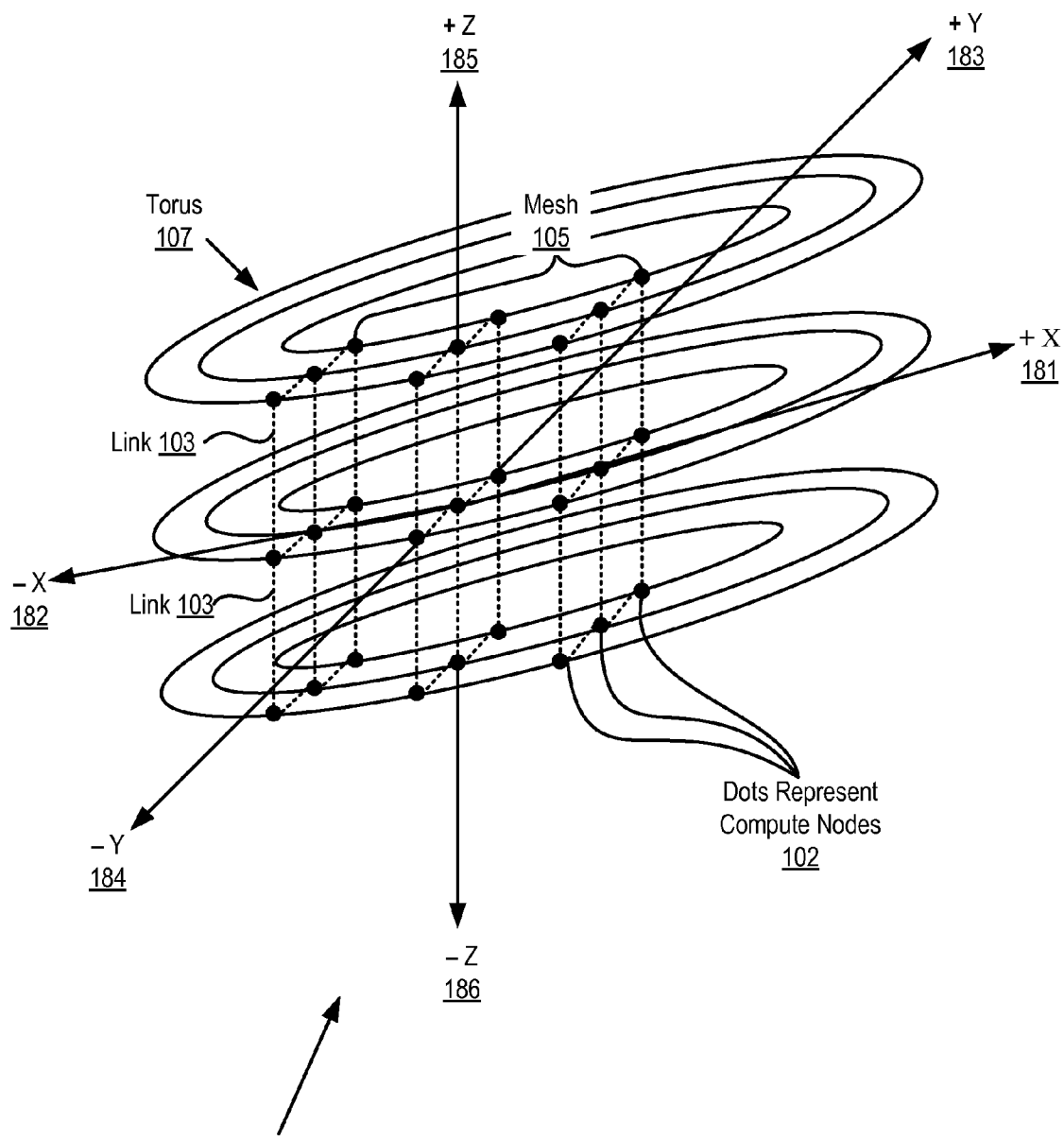
FIG. 4 sets forth a line drawing illustrating an exemplary data communications network optimized for point to point operations useful in systems capable of scheduling applications for execution on a plurality of compute nodes of a parallel computer to manage temperature of the plurality of compute nodes during execution in accordance with embodiments of the present invention.

For further explanation, FIG. 4 sets forth a line drawing illustrating an exemplary data communications network (108) optimized for point to point operations useful in systems capable of scheduling applications for execution on a plurality of compute nodes of a parallel computer to manage temperature of the plurality of compute nodes during execution in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in scheduling applications for execution on a plurality of compute nodes of a parallel computer to manage temperature of the plurality of compute nodes during execution in accordance with embodiments of the present invention may contain only a few compute nodes or may contain thousands of compute nodes.

Figure 5:
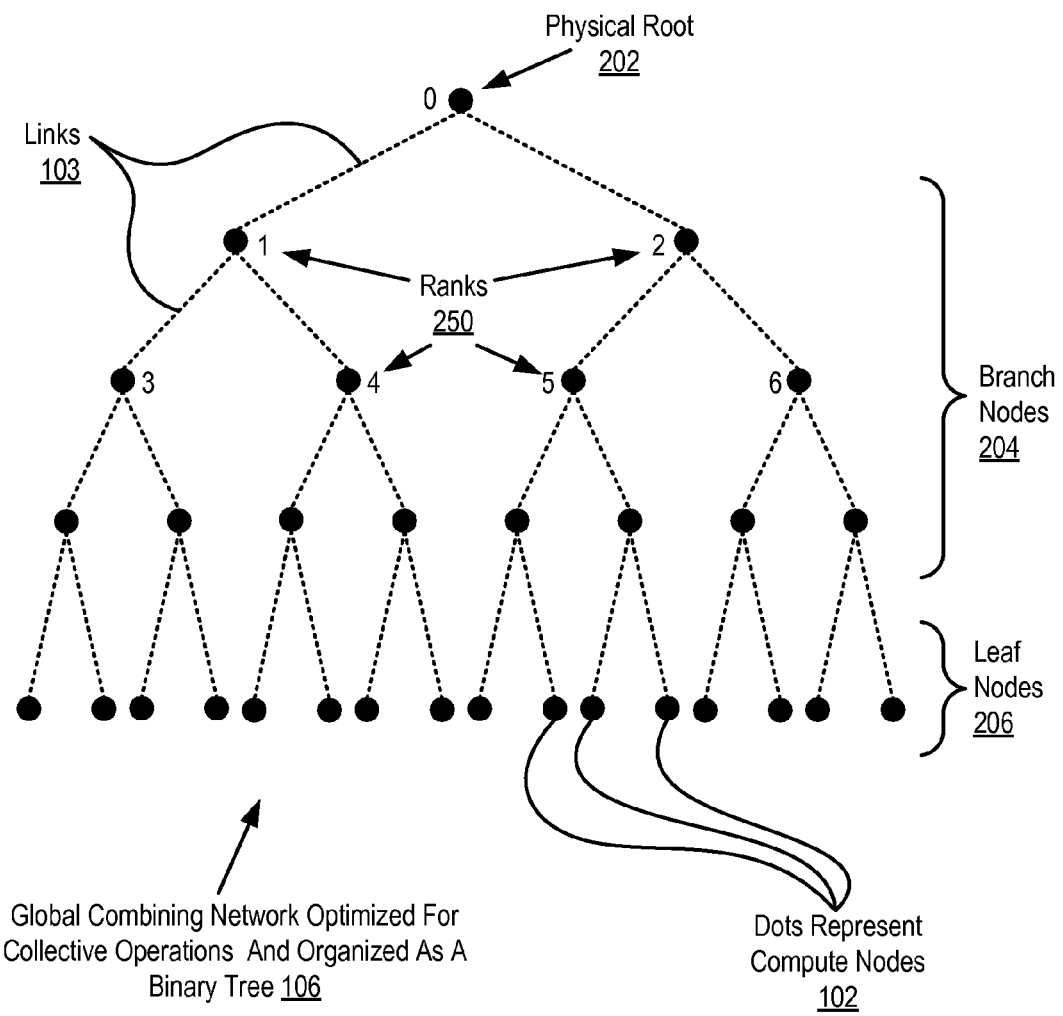
FIG. 5 sets forth a line drawing illustrating an exemplary data communications network optimized for collective operations useful in systems capable of scheduling applications for execution on a plurality of compute nodes of a parallel computer to manage temperature of the plurality of compute nodes during execution in accordance with embodiments of the present invention.

For further explanation, FIG. 5 sets forth a line drawing illustrating an exemplary data communications network (106) optimized for collective operations useful in systems capable of scheduling applications for execution on a plurality of compute nodes of a parallel computer to manage temperature of the plurality of compute nodes during execution in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for scheduling applications for execution on a plurality of compute nodes of a parallel computer to manage temperature of the plurality of compute nodes during execution in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
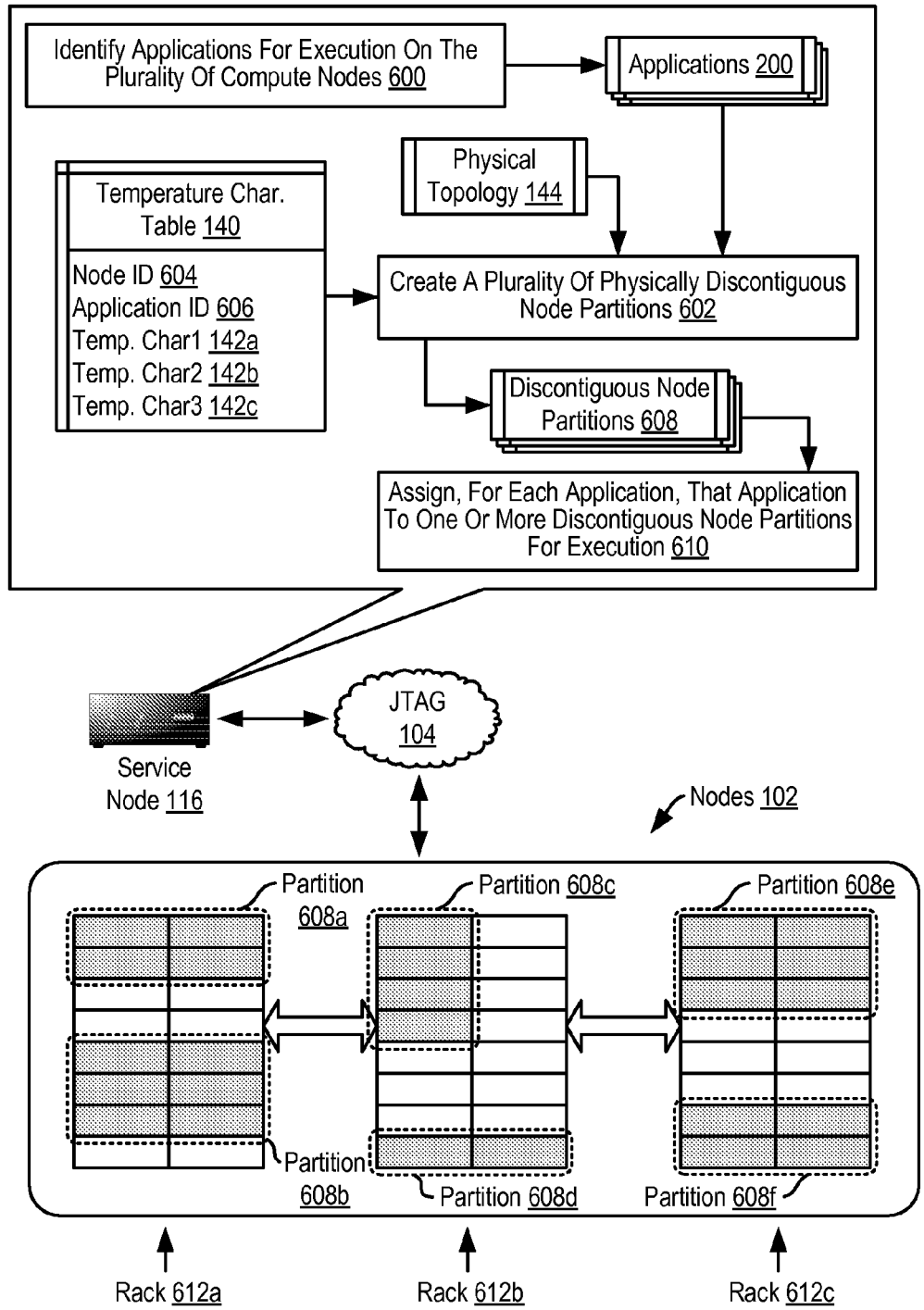
FIG. 6 sets forth a flow chart illustrating an exemplary method for scheduling applications for execution on a plurality of compute nodes of a parallel computer to manage temperature of the plurality of compute nodes during execution according to embodiments of the present invention.

For further explanation, FIG. 6 sets forth a flow chart illustrating an exemplary method for scheduling applications (200) for execution on a plurality of compute nodes (102) of a parallel computer to manage temperature of the plurality of compute nodes (102) during execution according to embodiments of the present invention. Scheduling applications (200) for execution on a plurality of compute nodes (102) of a parallel computer to manage temperature of the plurality of compute nodes (102) during execution according to the method of FIG. 6 is carried out on a service node (116). The service node (116) connects to the compute nodes (102) through a JTAG network (104). In the example of FIG. 6, the compute nodes (102) are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 6 includes identifying (600) one or more applications (200) for execution on the plurality of compute nodes (102). The service node (116) may identify (600) one or more applications (200) for execution on the plurality of compute nodes (102) according to the method of FIG. 6 by receiving application identifiers for the applications (200) from a system administrator through a user interface rendered on a display device. In some other embodiments, the service node (116) may identify (600) one or more applications (200) for execution on the plurality of compute nodes (102) according to the method of FIG. 6 by retrieving application identifiers for the applications (200) from a job list specifying a set of applications to execute.

The method of FIG. 6 also includes creating (602) a plurality of physically discontiguous node partitions (608) in dependence upon temperature characteristics (142) for the compute nodes (102) and a physical topology (144) for the compute nodes (102). As mentioned above, a node partition is a logical collection of physically adjacent compute nodes. The node partitions are 'physically discontiguous' in the sense that none of the compute nodes in distinct node partitions (608) are adjacent to one another. That is, between physically discontiguous node partitions, there physically exists a group of compute nodes that are not members of either node partition, or the node partitions are made up of compute nodes installed in different hardware housings. Each discontiguous node partition (608) of FIG. 6 specifies a collection of physically adjacent compute nodes.

FIG. 6 illustrates six discontiguous node partitions (608) and illustrates each compute node (102) included in a discontiguous node partition (608) with a grey background. The discontiguous node partition (608a) includes four compute nodes that occupy the top two rows in computer rack (612a). The discontiguous node partition (608b) includes six compute nodes that occupy three rows starting at the fifth row from the top in computer rack (612a). The discontiguous node partition (608c) includes four compute nodes that occupy the left side of the top four rows in computer rack (612b). The discontiguous node partition (608d) includes two compute nodes that occupy the bottom row in computer rack (612b). The discontiguous node partition (608e) includes six compute nodes that occupy the top three rows in computer rack (612c). The discontiguous node partition (608f) includes four compute nodes that occupy the bottom two rows in computer rack (612c).

The example of FIG. 6 includes a temperature characteristics table (140) that stores temperature characteristics (142) for the compute nodes (102). The temperature characteristics (142) for each compute node (102) describe the temperature of the compute node in various operating states. For example, one temperature characteristic may describe the temperature of the compute node when executing a particular application, while another temperature characteristic may describe the temperature of the compute node when the node is executing a different application. The temperature characteristics (142) of FIG. 1 may describe the temperature of the compute node as a whole or describe the temperature of individual hardware components that form the compute node. Each record of the temperature characteristics table (140) includes a node identifier (604), application identifier (606), and several temperature characteristics (142). The temperature characteristics (142) for each compute node (102) executing each application (200) may be based on historical measurements obtained while executing each application on a compute node. In other embodiments, however, the temperature characteristics (142) for each compute node (102) executing each application (200) may be based on estimates of power consumption. Such power consumption estimates may be based on the instructions included in each application. For example, if an application includes a number of float multiply-add instructions and the power required to perform each float multiply-add instruction is known, then the power consumption during execution of the application may be estimated using the number of float multiply-add instructions and the power required to perform each float multiply-add instruction.

In the example of FIG. 6, the physical topology (144) for the compute nodes (102) represents the physical configuration of the compute nodes in the parallel computer. That is, the physical topology (144) may represent the physical location of the compute nodes and each nodes' hardware components, the physical orientation of the compute nodes and each nodes' hardware components, and so on. In FIG. 6, the physical topology (144) describes the location of each compute node (102) in the computer racks (612).

The service node (116) may create (602) a plurality of physically discontiguous node partitions (608) according to the method of FIG. 6 by identifying the number of compute nodes needed for execution of each application. The service node (116) may identify the number of compute nodes needed for execution of each application based on a configuration file for each application. For example, the configuration file for a particular application may specify that the particular application should be executed on a minimum of sixteen compute nodes, while the configuration file for another application may specify that the particular application should be executed on a minimum of thirty-two compute nodes.

The service node (116) may further operate to create (602) a plurality of physically discontiguous node partitions (608) according to the method of FIG. 6 by estimating, for each application, the temperature of the compute nodes during execution of the application based on the number of nodes needed to execute the application. The service node (116) may estimate the temperature of the compute nodes during execution of each application using the temperature characteristics (142) for the compute nodes (102).

The service node (116) may also create (602) a plurality of physically discontiguous node partitions (608) according to the method of FIG. 6 by determining a level of physical separation between at least two groups of physically adjacent compute nodes in dependence upon the physical topology (144) that is required to keep the temperature of any given region of the parallel computer below a predetermined threshold. In such a manner, the service node (116) may obtain a minimum distance between any two discontiguous node partitions (608). The predetermined threshold may be statically configured by a system administrator or may vary dynamically with the ambient temperature of the rooms housing the parallel computer.

The service node (116) may then create (602) a plurality of physically discontiguous node partitions (608) according to the method of FIG. 6 by organizing, for each application, the number of compute nodes required for that application into a node partition (608) such that the compute nodes in that node partition (608) are no closer to nodes in any other partition than the determined level of physical separation between those two node partitions (608). The service node (116) may organize the compute nodes into a discontiguous node partition (608) by listing node identifiers for the nodes to be included in the node partition in table or other a data structure representing the discontiguous node partition. Readers will note that in some embodiments, thermal considerations or simply the number of compute node needed to execute an application may precipitate the need to divide the group of nodes executing a single application into two node partitions. For example, consider an application that requires a large number of nodes and such nodes result in high compute node temperatures when executing the application. To keep the temperature of the parallel computer below a threshold, the service node may split the nodes designated for executing such an application into two discontiguous node partitions.

The method of FIG. 6 includes assigning (610), for each application (200), that application (200) to one or more of the discontiguous node partitions (608) for execution on the compute nodes (102) specified by the assigned discontiguous node partitions. The service node (116) may assign (610) each application (200) to one or more of the discontiguous node partitions (608) for execution on the compute nodes (102) specified by the assigned discontiguous node partitions (608) by configuring the applications (200) on the nodes of the corresponding discontiguous node partitions (608) through the JTAG network (104) and instructing the compute nodes to begin execution of the applications (200).

As mentioned above, the compute nodes may have multiple processing cores and may be booted up in parallel processing or 'symmetric multi-processing' mode. Because some applications may not be designed to take advantage of the additional processing cores available for spawned threads in symmetric multi-processing mode, these additional cores needlessly consume power while providing no additional computing resources to execute the application. Accordingly, a service node may power down such processing core without effecting execution performance. For further explanation, therefore, FIG. 7 sets forth a flow chart illustrating a further exemplary method for scheduling applications (200) for execution on a plurality of compute nodes (102) of a parallel computer to manage temperature of the plurality of compute nodes (102) during execution according to embodiments of the present invention.

Figure 7:
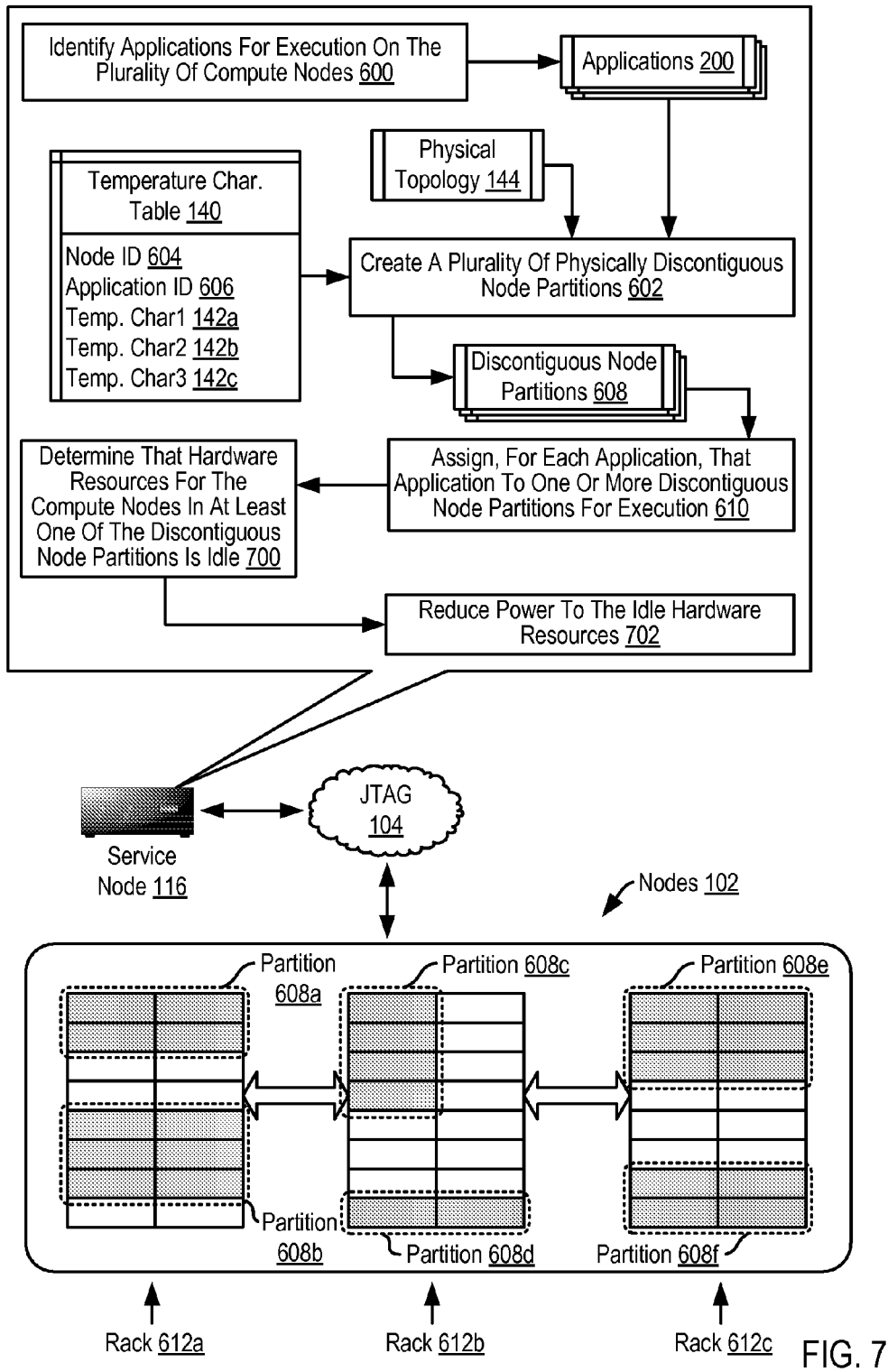
FIG. 7 sets forth a flow chart illustrating a further exemplary method for scheduling applications for execution on a plurality of compute nodes of a parallel computer to manage temperature of the plurality of compute nodes during execution according to embodiments of the present invention.

Similar to FIG. 6, scheduling applications (200) for execution on a plurality of compute nodes (102) of a parallel computer to manage temperature of the plurality of compute nodes (102) during execution according to the method of FIG. 7 is carried out on a service node (116). The service node (116) connects to the compute nodes (102) through a JTAG network (104). In the example of FIG. 7, the compute nodes (102) are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 7 is also similar to the method of FIG. 6 in that the method of FIG. 7 includes: identifying (600) one or more applications (200) for execution on the plurality of compute nodes (102); creating (602) a plurality of physically discontiguous node partitions (608) in dependence upon temperature characteristics (142) for the compute nodes (102) and a physical topology (144) for the compute nodes (102), each discontiguous node partition (608) specifying a collection of physically adjacent compute nodes; and assigning (610), for each application (200), that application (200) to one or more of the discontiguous node partitions (608) for execution on the compute nodes (102) specified by the assigned discontiguous node partitions. In the example of FIG. 7, a temperature characteristics table (140) stores the temperature characteristics (142). Each record of the temperature characteristics table (140) in FIG. 7 includes a node identifier (604), an application identifier (606), and several temperature characteristics (142).

The method of FIG. 7 also includes determining (700) that hardware resources for at least one of the compute nodes (102) in at least one of the discontiguous node partitions (608) is idle. The service node (116) may determine (700) that hardware resources for at least one of the compute nodes (102) in at least one of the discontiguous node partitions (608) is idle according to the method of FIG. 7 by monitoring the activity of the nodes' hardware components through the JTAG network (104) and comparing the activity to various activity thresholds that specify when the various hardware components are idle. For example, one activity threshold may establish that a processing core is idle if the only process running on that core for one second is the system's idle process.

The method of FIG. 7 also includes reducing (702) power to the idle hardware resources. The service node (116) may reduce (702) power to the idle hardware resources according to the method of FIG. 7 by throttling the operating speed of the idle hardware components or powering down the idle hardware component. The service node (116) may throttle the operating speed of the idle hardware components by modifying the values in the operating speed registers for the idle hardware components. The service node (116) may power down the idle hardware component by instructing the voltage regulator for that hardware component to remove power to the idle hardware component. Readers will note that when powering down some hardware components, the service node may save the state information for those hardware components and later restore the state information when the hardware components are powered on.

Even when applications execute in various discontiguous node partitions, the temperature in one region of the parallel computer may exceed a maximum temperature threshold established for that region. In such embodiments, a service node may migrate an application away from the region of the parallel computer in which temperature exceeds the threshold in favor of another region of the parallel computer well below the threshold. For further explanation, therefore, FIG. 8 sets forth a flow chart illustrating a further exemplary method for scheduling applications (200) for execution on a plurality of compute nodes (102) of a parallel computer to manage temperature of the plurality of compute nodes (102) during execution according to embodiments of the present invention.

Figure 8:
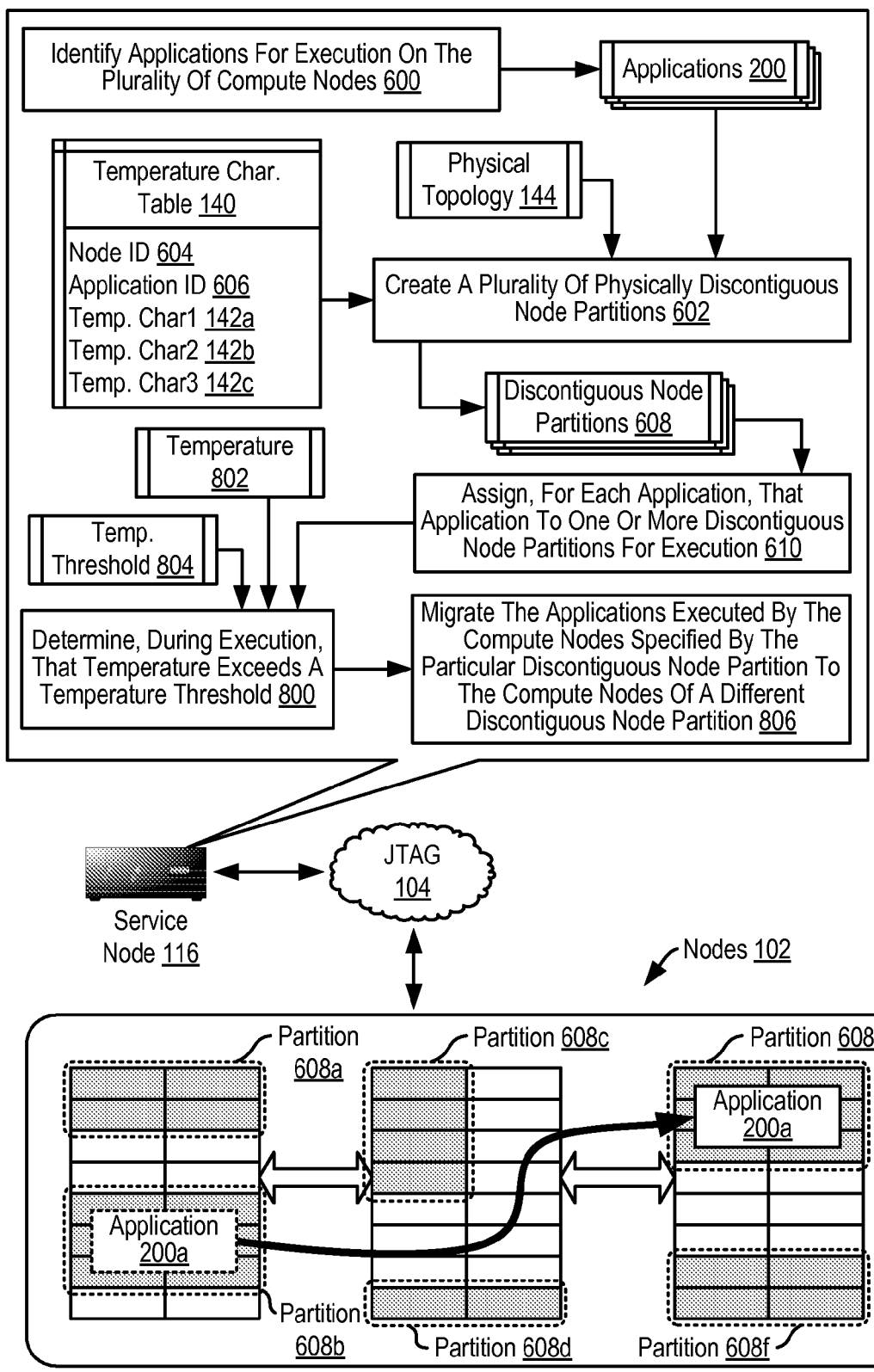
FIG. 8 sets forth a flow chart illustrating a further exemplary method for scheduling applications for execution on a plurality of compute nodes of a parallel computer to manage temperature of the plurality of compute nodes during execution according to embodiments of the present invention.

Similar to FIG. 6, scheduling applications (200) for execution on a plurality of compute nodes (102) of a parallel computer to manage temperature of the plurality of compute nodes (102) during execution according to the method of FIG. 8 is carried out on a service node (116). The service node (116) connects to the compute nodes (102) through a JTAG network (104). In the example of FIG. 8, the compute nodes (102) are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 8 is also similar to the method of FIG. 6 in that the method of FIG. 8 includes: identifying (600) one or more applications (200) for execution on the plurality of compute nodes (102); creating (602) a plurality of physically discontiguous node partitions (608) in dependence upon temperature characteristics (142) for the compute nodes (102) and a physical topology (144) for the compute nodes (102), each discontiguous node partition (608) specifying a collection of physically adjacent compute nodes; and assigning (610), for each application (200), that application (200) to one or more of the discontiguous node partitions (608) for execution on the compute nodes (102) specified by the assigned discontiguous node partitions. In the example of FIG. 8, a temperature characteristics table (140) stores the temperature characteristics (142). Each record of the temperature characteristics table (140) in FIG. 8 includes a node identifier (604), an application identifier (606), and several temperature characteristics (142).

The method of FIG. 8 also includes determining (800), during execution, that temperature (802) of the compute nodes specified by a particular discontiguous node partition exceeds a temperature threshold (804). The temperature threshold (804) of FIG. 8 may be statically configured by a system administrator or set to change dynamically based on certain inputs such as, for example, ambient temperature of the rooms in which the parallel computer is housed, the price of electricity used to cool the compute nodes, or any other inputs as will occur to those of skill in the art. The service node may determine (800) that temperature (802) of the compute nodes during execution exceeds the temperature threshold (804) by monitoring the temperature of the compute nodes (102) using temperature sensors configured in the compute nodes (102) and comparing the temperature (802) to the temperature threshold (804). The service node (116) may receive signals from the temperature sensors in the compute nodes (102) through the JTAG network (104).

The method of FIG. 8 includes migrating (806) the applications executed by the compute nodes specified by the particular discontiguous node partition to the compute nodes of a different discontiguous node partition. The service node (116) may migrate (806) the applications executed by the compute nodes specified by the particular discontiguous node partition to the compute nodes of a different discontiguous node partition according to the method of FIG. 8 by instructing the compute nodes currently executing the compute node to transmit the application (200a) to the compute nodes specified by the different discontiguous node partition. Such a transfer typically includes transferring the executable image of the application (200a), any hardware register values, operating system data structures for the application (200a), and so on. In the example of FIG. 8, the service node (1160) instructs the compute nodes in discontiguous node partition (608b) to transfer the application (200a) to the compute nodes in discontiguous node partition (608e). Migrating (806) the applications as described above advantageously helps the service node (116) prevent overheating in various regions of a parallel computer.

Exemplary embodiments of the present invention are described largely in the context of a fully functional computer system for scheduling applications for execution on a plurality of compute nodes of a parallel computer to manage temperature of the plurality of compute nodes during execution. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of scheduling applications for execution on a plurality of compute nodes of a parallel computer to manage temperature of the plurality of compute nodes during execution, the method comprising:
    identifying one or more applications for execution on the plurality of compute nodes;
    creating a plurality of physically discontiguous node partitions in dependence upon temperature characteristics for the compute nodes and a physical topology for the compute nodes, each discontiguous node partition specifying a collection of physically adjacent compute nodes, wherein the discontiguous node partitions are created in the same rack, wherein, between the discontiguous node partitions created in the same rack, there physically exists a group of compute nodes that are not members of any of the discontiguous node partitions; and
    assigning, for each application, that application to more than one of the discontiguous node partitions for execution on the compute nodes specified by the created discontiguous node partitions.

2. The method of claim 1 wherein creating a plurality of physically discontiguous node partitions in dependence upon temperature characteristics for the compute nodes and a physical topology for the compute nodes further comprises determining a level of physical separation between at least two groups of physically adjacent compute nodes in dependence upon the physical topology.

3. The method of claim 1 wherein assigning, for each application, that application to more than one of the discontiguous node partitions for execution on the compute nodes specified by the assigned discontiguous node partitions further comprises assigning the application to the discontiguous node partitions in dependence upon the temperature characteristics of the compute nodes in the assigned partitions when executing the application and the temperature characteristics of any compute nodes physically adjacent to the compute nodes in the assigned partitions.

4. The method of claim 1 further comprising:
    determining that hardware resources for at least one of the compute nodes in at least one of the discontiguous node partitions is idle; and
    reducing power to the idle hardware resources.

5. The method of claim 1 further comprising:
    determining, during execution, that temperature of the compute nodes specified by a particular discontiguous node partition exceeds a temperature threshold; and
    migrating the applications executed by the compute nodes specified by the particular discontiguous node partition to the compute nodes of a different discontiguous node partition.

6. The method of claim 1 wherein the plurality of compute nodes are connected together using a plurality of data communications networks, at least one of the data communications networks optimized for collective operations, and at least one of the data communications networks optimized for point to point operations.

7. An apparatus for scheduling applications for execution on a plurality of compute nodes of a parallel computer to manage temperature of the plurality of compute nodes during execution, the apparatus comprising one or more computer processors and computer memory operatively coupled to the computer processors, the computer memory having disposed within it computer program instructions capable of:
    identifying one or more applications for execution on the plurality of compute nodes;
    creating a plurality of physically discontiguous node partitions in dependence upon temperature characteristics for the compute nodes and a physical topology for the compute nodes, each discontiguous node partition specifying a collection of physically adjacent compute nodes, wherein the discontiguous node partitions are created in the same rack, wherein, between the discontiguous node partitions created in the same rack, there physically exists a group of compute nodes that are not members of any of the discontiguous node partitions; and
    assigning, for each application, that application to more than one of the discontiguous node partitions for execution on the compute nodes specified by the created discontiguous node partitions.

8. The apparatus of claim 7 wherein creating a plurality of physically discontiguous node partitions in dependence upon temperature characteristics for the compute nodes and a physical topology for the compute nodes further comprises determining a level of physical separation between at least two groups of physically adjacent compute nodes in dependence upon the physical topology.

9. The apparatus of claim 7 wherein assigning, for each application, that application to more than one of the discontiguous node partitions for execution on the compute nodes specified by the assigned discontiguous node partitions further comprises assigning the application to the discontiguous node partitions in dependence upon the temperature characteristics of the compute nodes in the assigned partitions when executing the application and the temperature characteristics of any compute nodes physically adjacent to the compute nodes in the assigned partitions.

10. The apparatus of claim 7 wherein the computer memory has disposed within it computer program instructions capable of:
    determining that hardware resources for at least one of the compute nodes in at least one of the discontiguous node partitions is idle; and
    reducing power to the idle hardware resources.

11. The apparatus of claim 7 wherein the computer memory has disposed within it computer program instructions capable of:
    determining, during execution, that temperature of the compute nodes specified by a particular discontiguous node partition exceeds a temperature threshold; and
    migrating the applications executed by the compute nodes specified by the particular discontiguous node partition to the compute nodes of a different discontiguous node partition.

12. The apparatus of claim 7 wherein the plurality of compute nodes are connected together using a plurality of data communications networks, at least one of the data communications networks optimized for collective operations, and at least one of the data communications networks optimized for point to point operations.

13. A computer program product for scheduling applications for execution on a plurality of compute nodes of a parallel computer to manage temperature of the plurality of compute nodes during execution, the computer program product disposed upon a computer readable, recordable storage medium, the computer program product comprising computer program instructions that, when executed by a computer, cause the computer to carry out the steps of:

identifying one or more applications for execution on the plurality of compute nodes;

creating a plurality of physically discontiguous node partitions in dependence upon temperature characteristics for the compute nodes and a physical topology for the compute nodes, each discontiguous node partition specifying a collection of physically adjacent compute nodes, wherein the discontiguous node partitions are created in the same rack, wherein, between the discontiguous node partitions created in the same rack, there physically exists a group of compute nodes that are not members of any of the discontiguous node partitions; and assigning, for each application, that application to more than one of the discontiguous node partitions for execution on the compute nodes specified by the created discontiguous node partitions.

14. The computer program product of claim 13 wherein creating a plurality of physically discontiguous node partitions in dependence upon temperature characteristics for the compute nodes and a physical topology for the compute nodes further comprises determining a level of physical separation between at least two groups of physically adjacent compute nodes in dependence upon the physical topology.

15. The computer program product of claim 13 wherein assigning, for each application, that application to more than one of the discontiguous node partitions for execution on the compute nodes specified by the assigned discontiguous node partitions further comprises assigning the application to the discontiguous node partitions in dependence upon the temperature characteristics of the compute nodes in the assigned partitions when executing the application and the temperature characteristics of any compute nodes physically adjacent to the compute nodes in the assigned partitions.

16. The computer program product of claim 13 further comprises computer program instructions that, when executed by a computer, cause the computer to carry out the steps of:

determining that hardware resources for at least one of the compute nodes in at least one of the discontiguous node partitions is idle; and reducing power to the idle hardware resources.

17. The computer program product of claim 13 further comprises computer program instructions that, when executed by the computer, cause the computer to carry out the steps of:

determining, during execution, that temperature of the compute nodes specified by a particular discontiguous node partition exceeds a temperature threshold; and migrating the applications executed by the compute nodes specified by the particular discontiguous node partition to the compute nodes of a different discontiguous node partition.

18. The computer program product of claim 13 wherein the plurality of compute nodes are connected together using a plurality of data communications networks, at least one of the data communications networks optimized for collective operations, and at least one of the data communications networks optimized for point to point operations.

* * * * *